United States Patent [19]

Forschirm

[11] 3,973,907

[45] Aug. 10, 1976

[54] DYEING OF HALOGENATED AROMATIC POLYESTER FIBROUS MATERIALS WITH DIMETHYLTEREPHTHALATE

[75] Inventor: Alex S. Forschirm, Lake Hiawatha, N.J.

[73] Assignee: Celanese Corporation, New York, N.Y.

[22] Filed: July 28, 1975

[21] Appl. No.: 599,556

[52] U.S. Cl. .................................. 8/172 R; 8/173
[51] Int. Cl.$^2$ .......................................... D06P 3/54
[58] Field of Search ...................... 8/172, 173, 179; 260/47 C

[56] References Cited
UNITED STATES PATENTS

| | | | |
|---|---|---|---|
| 2,035,578 | 3/1936 | Wagner | 260/75 R |
| 3,234,167 | 2/1966 | Wycliffe | 260/47 C |
| 3,864,448 | 2/1975 | Stockmann | 260/47 C |

*Primary Examiner*—Donald Levy

[57] ABSTRACT

Heretofore, halogenated aromatic polyesters (as defined), such as those formed by the reaction of tetrabromobisphenol A, and a mixture of isophthaloyl chloride and terephthaloyl chloride, have proven to be extremely difficult to dye and to undergo a deleterious fiber degradation when dyeing is attempted in the presence of common dye carriers. Difficulties heretofore encountered when attempts have been made to dye such fibrous materials effectively are eliminated in the substantial absence of fiber degradation when practicing the present process. The dyeing of the specifically defined halogenated aromatic polyester fibrous material with an aqueous disperse dye system is carried out in a closed dyeing zone at a temperature of about 110° to 130°C. in the presence of a dimethylterephthalate dye carrier.

12 Claims, No Drawings

DYEING OF HALOGENATED AROMATIC POLYESTER FIBROUS MATERIALS WITH DIMETHYLTEREPHTHALATE

BACKGROUND OF THE INVENTION

Interest in flame retardant fibrous materials steadily has increased over the past decade spurred in part by a recognition of the serious hazards fires pose to property and life. New and stricter fire safety standards are being proposed by both governmental and non-governmental sources. The National Fire Protection Association estimates that in 1970 more than 2.5 million fires caused $2.6 billion in direct property losses and another $7.8 billion in indirect losses. Nearly 2 million people are involved in fires each year, and of these about 75,000 are hospitalized. Fires associated with flammable fabrics alone are estimated to cause 200,000 to 300,000 injuries each year. Associated medical costs are staggering, running well into the hundreds of millions of dollars. Accordingly a number of inherently non-burning fibrous materials have been proposed to offer the public a greater degree of fire safety particularly when fibrous articles are required for use in fire-critical environments, e.g., children's sleepwear, suits for firefighters, hospital furnishings, uniforms for military and civilian flight personnel, etc.

For instance, aromatic polyester flame retardant fibrous materials of the recurring structural formula:

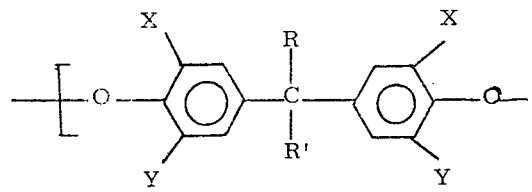

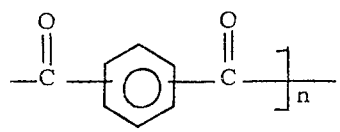

where X is chlorine or bromine, Y is hydrogen, chlorine, or bromine, R and R' may be the same or different and represent lower alkyl groups, hydrogen, or together constitute a cyclic hydrocarbon group, and $n =$ at least 25, offer a significant degree of fire safety. A minor concentration of an oxide of antimony optionally may be dispersed within the same. It has been found, however, that such fibrous materials tend to possess a relatively high glass transition temperature, and to be highly resistant to dyeing by the usual techniques for applying a disperse dye even if a usual dye carrier is employed. It further has been observed that common dye carriers such as o-phenylphenol, biphenyl, butyl benzoate, toluene, benzene, methyl salicylate, naphthalene, etc. tend to degrade fibrous materials of such halogenated aromatic polyesters. For instance, the fibrous material may exhibit any or all of the following: coalescence, stiffness, a lessened strength, broken fils, and dullness.

It is an object of the present invention to provide an improved process for the dyeing of certain halogenated aromatic polyester fibrous materials.

It is an object of the present invention to provide an improved process wherein certain halogenated aromatic polyester fibrous materials are effectively dyed with disperse dyes.

It is another object of the present invention to provide an improved dyeing process for certain halogenated aromatic polyester fibrous materials which can be carried out in the substantial absence of the usual fiber degradation commonly encountered with such fibrous materials.

These and other objects, as well as the scope, nature, and utilization of the claimed invention will be apparent to those skilled in the art from the following detailed description and appended claims.

SUMMARY OF THE INVENTION

It has been found that an improved process for the dyeing of a halogenated aromatic polyester fibrous material having recurring units of the formula:

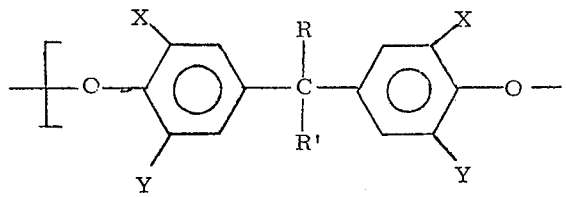

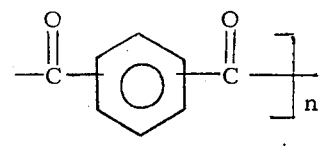

where X is chlorine or bromine, Y is hydrogen, chlorine or bromine, R and R' may be the same or different and represent lower alkyl groups, hydrogen, or together constitute a cyclic hydrocarbon group, and $n =$ at least 25, comprises contacting the fibrous material with an aqueous dyebath in a closed dyeing zone at a temperature of about 110° to 130°C. containing a disperse dye and an effective concentration of a dimethylterephthalate dye carrier in the substantial absence of fiber degradation.

DESCRIPTION OF PREFERRED EMBODIMENTS

The halogenated aromatic polyester fibrous material which is dyed in accordance with the process of the present invention has recurring units of the structural formula:

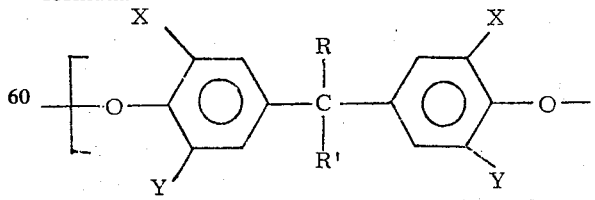

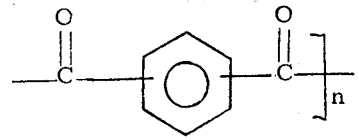

where X is chlorine or bromine, Y is hydrogen, chlorine or bromine, R and R' may be the same or different and represent lower alkyl groups (e.g., 1 to 5 carbon atoms), hydrogen, or together constitute a cyclic hydrocarbon group, and $n =$ at least 25, (e.g., $n =$ about 40 to 400). Commonly the aromatic polyester utilized in the present invention has a chlorine and/or bromine content of about 15 to 60 percent by weight based upon the weight of the aromatic polyester, e.g. a chlorine and/or bromine content of about 25 to 50 percent by weight. As is apparent from the structural formula, the aromatic polyester is chlorinated and/or brominated in the sense that these substituent groups are directly attached to an aromatic ring. Preferably the halogen substituents are either all chlorine or all bromine. In a particularly preferred embodiment the halogen substituents are all bromine.

The end groups of the aromatic polyester illustrated in the formula commonly are —OH, or

depending upon the synthesis route selected as will be apparent to those skilled in the art. Suitable methods for the manufacture of such aromatic polyesters are disclosed in U.S. Pat. Nos. 2,035,578; 3,324,167; and 3,824,213; Australian Pat. No. 242,803; British Pat. No. 924,607; and commonly assigned U.S. Ser. No. 527,613, filed Nov. 27, 1974, which are herein incorporated by reference. The chlorinated or brominated aromatic polyester may be formed by the condensation of tetrachlorobisphenol A (i.e., 4,4'-isopropylidene-2,2',6,6'-tetrachlorodiphenol) or tetrabromobisphenol A (i.e., 4,4'-isopropylidene-2,2',6,6'-tetrabromodiphenol) with isophthalic acid and/or terephthalic acid or the ester-forming derivatives thereof.

A preferred chlorinated aromatic polyester is formed by the condensation of tetrachlorobisphenol A (i.e., 4,4'-isopropylidene-2,2',6,6'-tetrachlorodiphenol) with an aromatic acid mixture of about 90 to 40 percent isophthalic acid (e.g., 80 to 60 percent by weight) and correspondingly about 10 to 60 percent by weight terephthalic acid (e.g., 20 to 40 percent by weight) or the ester-forming derivatives thereof. For instance, a lower carboxylic acid diester of a monocarboxylic acid possessing 2 to 5 carbon atoms and tetrachlorobisphenol A may be reacted with a mixture of terephthalic acid and isophthalic acid in the presence of an appropriate solvent and catalyst. A preferred brominated aromatic polyester is formed by the condensation of tetrabromobisphenol A (i.e., 4,4'-isopropylidene-2,2',6,6'-tetrabromodiphenol) with an aromatic acid mixture of about 45 to 75 percent by weight (e.g. 60 percent by weight) isophthalic acid and correspondingly about 55 to 25 percent by weight (e.g. 40 percent by weight) terephthalic acid or the ester-forming derivatives thereof. For instance, tetrabromobisphenol A may be reacted with a mixture of isophthaloyl chloride and terephthaloyl chloride in the presence of an appropriate solvent and catalyst to produce a polymer having —OH and

end groups.

The aromatic polyester fibrous material which undergoes dyeing in the present process optionally may include a minor proportion of an oxide of antimony, e.g., antimony trioxide ($Sb_2O_3$) or antimony pentoxide ($Sb_2O_5$), or other additive intimately dispersed therein. The oxide of antimony component may be simply dispersed in the spinning solution from which the additive fiber is formed and when present within the resulting fiber enhances its flame resistance. The antimony trioxide which may be incorporated in the additive fiber is sometimes identified as antimony white, or antimony oxide. The antimony pentoxide component is sometimes identified as antimonic anhydride, antimonic acid or stibic anhydride. The oxide of antimony may be provided in the additive fiber in a concentration of 0.1 to 20 percent by weight (e.g., 0.4 to 8 percent by weight) based upon the weight of said chlorinated and/or brominated aromatic polyester. The particle size of the oxide of antimony is sufficiently small that it does not obstruct or otherwise interfere with the extrusion of the spinning solution during fiber formation.

The halogenated aromatic polyester which is dyed in accordance with the present process may be provided in a variety of physical configurations. For instance, the fibrous material may be provided as fluff, silver, yarns, tows, roving, fibrids, filaments, etc., and may consist of staple or continuous fibers. If desired, the fibrous material may be present as a fiber assemblage when dyed, e.g., as a woven or knitted fabric. Alternatively, other fiber types may be blended with the halogenated aromatic polyester fibers at the time of the dyeing.

During the dyeing step of the present process the aromatic polyester fibrous material is contacted with an aqueous dyebath (as defined) under appropriate conditions (as defined) which have been found to be effective in satisfactorily dyeing the same in the substantial absence of fiber degradation.

The dyebath utilized in the present process is aqueous in nature and includes as its essential ingredients a disperse dye and an effective concentration of a dimethylterephthalate dye carrier. The disperse dye utilized in the present process may be varied widely and is nonionic in character. For instance, the disperse dye may be selected from among those disperse dyes commonly utilized in the dyeing of polyethylene terephthalate fibrous materials. The disperse dye may simply be dispersed in an aqueous medium in accordance with conventional dyebath technology involving the use of such dyes. These dyes fall mainly into three chemical classes, i.e., (a) nitroarylamine, (b) azo, and (c) anthroquinone, and commonly contain amino or substituted amino groups. Representative disperse dyes which are particularly suited for use in the present process are CI Disperse Blue 56, Blue 61, Blue 27, Red 35, Red 60, Red 88. Other representative disperse dyes are identified in the Colour Index, Third Edition, Vol. 2, Pages 2479 to 2741 (1971) by the Society of Dyers and Colourists and The American Association of Textile Chemists and Colorists.

The dimethylterephthalate dye carrier has the structural formula $C_6H_4(COOCH_3)_2$ and is sometimes identified as DMT. The dye carrier may be formed by the oxidation of para-xylene or other xylene isomers followed by esterification and is commercially available as colorless crystals which melt at about 140°C. The carrier is finely divided and is largely dispersed in the aqueous dyebath in an appropriate concentration where it has been found to serve as an effective dye carrier or dye assistant for the specifically defined halogenated aromatic polyester fibrous material. The dimethylterephthalate dye carrier is commercially available from the DuPont Company under the designation "Latyl" Carrier A dye carrier and is specifically produced by DuPont as a dye assistant for increasing the dyeability of "Dacron" non-halogenated polyethylene terephthalate fiber. The dimethylterephthalate dye carrier commonly is provided in the dyebath in a concentration of about 5 to 50 percent by weight based upon the weight of the fiber, (e.g., in a concentration of about 10 to 30 percent by weight based upon the weight of the fiber).

Additional ingredients optionally may be provided within the aqueous dyebath in addition to the disperse dye and dimethylterephthalate. For instance, one or more surface active agents such as commonly utilized in a disperse dye dyebath may be present. For instance, a nonionic surfactant or a mixture of anionic and non-ionic surfactants may be present in a concentration of about 0.05 to 5 percent by weight based upon the weight of the dyebath. Also, in a preferred embodiment of the process benzanilide is provided in the dyebath. For instance, finely divided benzanilide may be dispersed within the aqueous dyebath in a concentration which approximates that of the dimethylterephthalate dye carrier.

In a preferred embodiment of the process the aqueous dyebath when initially contacted with the halogenated aromatic polyester fibrous material comprises about 2 to 4 percent by weight disperse dye based upon the weight of the fiber, about 10 to 30 percent by weight dimethylterephthalate based upon the weight of the fiber, about 10 to 30 percent by weight benzanilide based upon the weight of the fiber and about 0.05 to 0.2 percent by weight surface active agent based upon the weight of dyebath.

For best results it is recommended that the halogenated aromatic polyester be scoured prior to dyeing in accordance with conventional techniques.

During the dyeing step of the process the halogenated aromatic polyester fibrous material and aqueous dyebath are provided at an elevated temperature of about 110° to 130°C. in a closed dyeing zone at autogenous pressure. In a particularly preferred embodiment of the process dyebath temperatures of about 115° to 125°C. are utilized. Pressures of about 10 to 20 psig commonly are achieved within the dyeing zone. If dyeing temperatures much below 110°C. are utilized (e.g., 100°C.) the degree of dyeing achieved is much less. For instance, at 100°C. and atmospheric pressure a poor yield is achieved even if the dimethylterephthalate dye carrier is present. Surprisingly, no substantial fiber degradation occurs through the use of the present process in spite of the relatively severe dyeing conditions. Typically dyebath to fiber weight ratios of about 20 to 1 to about 80 to 1 (e.g., 70 to 1) may be employed, and dyeing times of about 1 to 3 hours.

Following dyeing the fibers may be subjected to a conventional scouring treatment, e.g., with tetrasodiumpyrophosphate.

In the absence of the dimethylterephthalate the dyebath will not function to effectively dye the aromatic polyester fibrous material regardless of the temperature and pressure utilized when dyeing is attempted. Common dye carriers such as o-phenylphenol, biphenyl, butyl benzoate, diallyl phthalate, benzyl alcohol, benzoic acid, toluene, etc. have proven to be ineffective when used with the halogenated aromatic polyester, and to result in a substantial fiber degradation when dyeing is attempted, i.e., fiber coalescence, fiber stiffening and/or substantial loss of fiber strength.

The resulting dyed halogenated aromatic polyester fibrous materials may be utilized in both textile and non-textile applications. For instance, carpets, textiles, wall coverings, hospital cubicle draperies, children's sleepwear, flight suits, slippers, upholstery, thread, apparel, etc. may be formed from the same.

The following examples are given as specific illustrations of the claimed invention. It should be understood, however, that the invention is not limited to the specific details set forth in the examples.

EXAMPLE I

A chlorinated aromatic polyester containing chlorine chemically bound to an aromatic ring is formed by reacting 190.9 parts by weight of tetrachlorobisphenol A and a mixture of 75.6 parts by weight isophthaloyl chloride and 32.4 parts by weight terephthaloyl chloride. The resulting chlorinated polyester possesses the structural formula heretofore illustrated where X and Y are chlorine groups, R and R' are methyl groups, and $n =$ about 80. The chlorinated aromatic polyester has a chlorine content of about 27 percent by weight, a melting point above about 338°C., and an inherent viscosity of about 0.8 deciliters per gram determined at a concentration of 0.1 percent by weight in a solvent which is a mixture of 10 parts by weight phenol and 7 parts by weight trichlorophenol.

The chlorinated aromatic polyester is solution spun from a methylene chloride spinning solvent into an evaporative air atmosphere to form a filamentary material which is hot drawn, crimped, cut into 1½ inch lengths, and knitted into a circular hoseleg.

A dyebath comprising 70 parts by weight water, 0.02 part by weight C.I. Disperse Blue 27 dye, 0.21 part by weight dimethylterephthalate, 0.21 part by weight benzanilide, and 0.07 part by weight anionic surfactant with 1 part by weight of the circular hoseleg was utilized to carry out the dyeing. The dimethylterephthalate dye carrier in combination with the benzanilide is commercially available from DuPont under the designation "Latyl" Carrier A dye carrier.

More specifically, the dyeing is carried out in accordance with the following procedure: All ingredients except for the dye are brought together in an Ahiba dyeing machine capable of operating at superatmospheric pressure, and are maintained at 60°C. for 10 minutes. The dye dispersed in water is then added and the bath sealed and brought to 120°C. and held for two hours. At the end of this time the bath is cooled and the hoseleg is scoured. The hoseleg is effectively dyed in the absence of fiber degradation.

EXAMPLE II

Example I is repeated with the exception that a brominated aromatic polyester containing bromine chemically bound to an aromatic ring is substituted for the chlorinated aromatic polyester. More specifically, the brominated aromatic polyester is formed by reacting 201.7 parts by weight tetrabromobisphenol A and a mixture of 46 parts by weight isophthaloyl chloride and 30.8 parts by weight terephthaloyl chloride. The resulting brominated aromatic polyester possesses the structural formula heretofore illustrated where X and Y are bromine groups, R and R' are methyl groups, and $n$ = about 50. The brominated aromatic polyester has a bromine content of about 48 percent by weight, a melting point of about 265°C., and exhibits an inherent viscosity of about 0.75 deciliters per gram determined at a concentration of 0.1 percent by weight in a solvent which is a mixture of 10 parts by weight of phenol and 7 parts by weight trichlorophenol.

Upon the dyeing of the brominated aromatic polyester in an identical dyebath substantially similar results are obtained in the absence of fiber degradation.

Although the invention has been described with preferred embodiments, it is to be understood that variations and modifications may be resorted to as will be apparent to those skilled in the art. Such variations and modifications are to be considered within the purview and the scope of the claims appended hereto.

I claim:

1. An improved process for dyeing of a halogenated aromatic polyester fibrous material having recurring units of the formula:

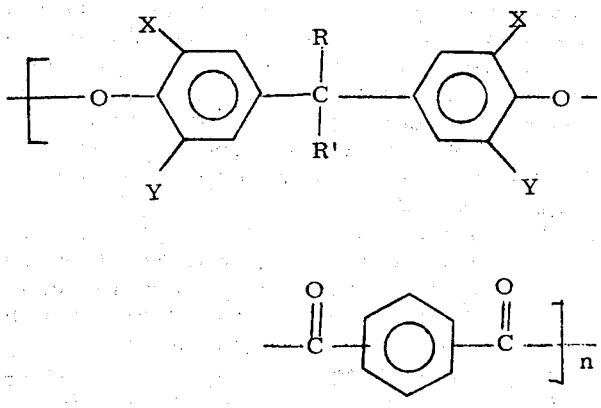

where X is chlorine or bromine, Y is hydrogen, chlorine or bromine, R and R' may be the same or different and represent lower alkyl groups, hydrogen, or together constitute a cyclic hydrocarbon group, and $n$ = at least 25, comprising contacting said fibrous material with an aqueous dyebath in a closed dyeing zone at a temperature of about 110° to 130°C. containing a disperse dye and an effective concentration of a dimethylterephthalate dye carrier in the substantial absence of fiber degradation.

2. A process according to claim 1 wherein Y of said recurring structural formula is chlorine or bromine and is the same as X.

3. A process according to claim 1 wherein said aromatic polyester of the recurring structural formula is a product of tetrabromobisphenol A, isophthalic acid, and terephthalic acid or the ester-forming derivatives thereof.

4. A process according to claim 3 wherein said aromatic polyester is formed by the reaction of tetrabromobisphenol A and a mixture of 45 to 75 percent by weight isophthaloyl chloride and correspondingly about 55 to 25 percent by weight terephthaloyl chloride.

5. A process according to claim 1 wherein $n$ in said formula equals about 40 to 400.

6. A process according to claim 1 wherein closed dyeing zone is provided at a temperature of about 115° to 125°C.

7. A process according to claim 1 wherein said aqueous dyebath additionally includes benzanilide dissolved therein.

8. A process according to Claim 1 wherein the ratio of said aqueous dyebath to said fibrous material is about 20 to 1 to about 80 to 1.

9. A process according to claim 1 wherein said dimethylterephthalate dye carrier is present in said dyebath in a concentration of about 5 to 50 percent by weight based upon the weight of said fibrous material.

10. An improved process for the dyeing of a brominated aromatic polyester fibrous material formed by the reaction of tetrabromobisphenol A and a mixture of 45 to 75 percent by weight isophthaloyl chloride and correspondingly 55 to 25 percent by weight terephthaloyl chloride, comprising contacting said fibrous material with an aqueous dyebath at a ratio of dyebath to fibrous material of about 20 to 1 to about 80 to 1 in a closed dyeing zone at a temperature of about 110° to 130°C. containing about 2 to 4 percent by weight of a disperse dye based upon the weight of the fibrous material, about 10 to 30 percent weight dimethylterephthalate dye carrier based upon the weight of the fibrous material, about 10 to 30 percent by weight benzanilide based upon the weight of the fibrous material, and about 0.5 to 0.2 percent by weight of surface active agent based upon the weight of the dyebath in the substantial absence of fiber degradation.

11. A process according to claim 10 wherein said brominated aromatic polyester fibrous material is formed by the reaction of tetrabromobisphenol A and a mixture of about 60 percent by weight isophthaloyl chloride and correspondingly about 40 percent by weight terephthaloyl chloride.

12. A process according to Claim 11 wherein said closed dyeing zone is provided at a temperature of about 115° to 125°C.

* * * * *